United States Patent
Parakrama

(10) Patent No.: US 9,659,373 B2
(45) Date of Patent: May 23, 2017

(54) METHOD AND DEVICE FOR ASCERTAINING A BLIND AREA OF A CAMERA

(71) Applicant: Robert Bosch GmbH, Stuttgart (DE)

(72) Inventor: Thusitha Parakrama, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/603,995

(22) Filed: Jan. 23, 2015

(65) Prior Publication Data

US 2015/0206305 A1    Jul. 23, 2015

(30) Foreign Application Priority Data

Jan. 23, 2014  (DE) .......................... 10 2014 201 161

(51) Int. Cl.
| | | |
|---|---|---|
| *G06K 9/00* | (2006.01) | |
| *G06T 7/00* | (2006.01) | |
| *B60Q 1/00* | (2006.01) | |

(52) U.S. Cl.
CPC .............. *G06T 7/0022* (2013.01); *B60Q 1/00* (2013.01); *G06K 9/00791* (2013.01); *G06T 7/0002* (2013.01); *G06K 9/00523* (2013.01); *G06T 2207/10016* (2013.01); *G06T 2207/30168* (2013.01); *G06T 2207/30248* (2013.01); *G06T 2207/30252* (2013.01)

(58) Field of Classification Search
CPC ............. G06K 9/00523; G06K 9/0055; G06K 9/00791; B60Q 1/00; G06T 7/0002; G06T 7/0022; G06T 2207/30248
See application file for complete search history.

(56) References Cited

U.S. PATENT DOCUMENTS

| 2005/0195163 | A1* | 9/2005 | Grewal | G09G 3/006 345/157 |
|---|---|---|---|---|
| 2007/0216786 | A1* | 9/2007 | Hung | H04N 9/045 348/246 |
| 2009/0303357 | A1* | 12/2009 | Tajima | H04N 9/045 348/246 |

(Continued)

OTHER PUBLICATIONS

Bosco et al. ("Hardware-software solution for high precision defect correction in digital image sensors," IEEE International Symposium on Consumer Electronics, Apr. 14-16, 2008).*

(Continued)

*Primary Examiner* — Yubin Hung
(74) *Attorney, Agent, or Firm* — Norton Rose Fulbright US LLP; Gerard A. Messina

(57) ABSTRACT

A method for ascertaining a blind area of a camera includes a step of forming a first signal curve of a plurality of gradients, which have been determined as a function of gray values of adjacent image points of an image section of a first image recorded by the camera, and a second signal curve of a plurality of gradients, which have been determined as a function of gray values of adjacent image points of the image section of a second image recorded by the camera, the second image having been recorded with a time lag relative to the first image, and detecting the blind area, if a comparison of the first signal curve with the second signal curve shows that at least one section of the first signal curve is identical to a corresponding section of the second signal curve.

21 Claims, 4 Drawing Sheets

(56) References Cited

U.S. PATENT DOCUMENTS

| | | | | |
|---|---|---|---|---|
| 2009/0315723 A1* | 12/2009 | Linsenmaier | ......... | B60R 1/0602 |
| | | | | 340/583 |
| 2010/0141810 A1* | 6/2010 | Wang | ................... | H04N 5/3675 |
| | | | | 348/246 |
| 2011/0091101 A1* | 4/2011 | Cote | ....................... | G06T 5/008 |
| | | | | 382/167 |
| 2011/0102624 A1* | 5/2011 | Hashizume | .......... | H04N 5/3675 |
| | | | | 348/222.1 |
| 2012/0092533 A1* | 4/2012 | Komori | .................. | H04N 5/367 |
| | | | | 348/251 |
| 2013/0300869 A1* | 11/2013 | Lu | ........................... | H04N 7/18 |
| | | | | 348/148 |

OTHER PUBLICATIONS

Raghavan et al. ("Detection of scene obstructions and persistent view changes in transportation camera systems," 15th International IEEE Conference on Intelligent Transportation Systems, Sep. 16-19, 2012).*

* cited by examiner

METHOD AND DEVICE FOR ASCERTAINING A BLIND AREA OF A CAMERA

RELATED APPLICATION INFORMATION

The present application claims priority to and the benefit of German patent application no. 10 2014 201 161.2, which was filed in Germany on Jan. 23, 2014, the disclosure of which is incorporated herein by reference.

FIELD OF THE INVENTION

The present invention relates to a method for ascertaining a blind area of camera, to a corresponding device and to a corresponding computer program product.

BACKGROUND INFORMATION

Cameras, for example, video cameras, are increasingly used in the automotive sector and in the industry for improving safety and process flows. When in use, the functionality of the video-based driver assistance systems and safety systems or industrial camera systems used may be adversely affected by blind areas of the camera. Such blind areas may, for example, be caused by an image sensor malfunction or an unintentional partial or complete covering of the field of vision of the camera used, for example, as a result of, in part, large particles adhering to the camera.

SUMMARY OF THE INVENTION

Against this background, the approach described herein provides a method for ascertaining a blind area of a camera, in addition to a device which uses this method and, finally, a corresponding computer program product according to the main claims. Advantageous embodiments result from the respective subclaims and the following description.

A comparison of signal curves based on gray value changes for image data of two consecutive camera recordings makes it possible to automatically carry out a rapid and resource-conserving detection of a blind area of a camera.

In one continuation of the concept described herein, a method for automatically cleaning the soiled field of vision of the camera or for outputting a warning signal to a user may be carried out in response to the detection of the blind area, for example.

The method for detecting a blind camera area described herein may be very efficiently carried out, and may therefore also be used in conjunction with the merely limited computing and memory capacities available to a large number of the driver assistance systems and industrial cameras and security cameras. An algorithm for image data comparison on which the method is based may be configured for a real time calculation for each individual time window by configuring it in such a way that redundant information processing and computing processes, which require a large amount of memory, may be dispensed with. In addition, the algorithm is suited for pre-processing the image data using an FPGA and for calculating and detecting the blind area using a microcontroller.

Particular advantages of the method described herein and a corresponding device are apparent in the use of a camera in such safety-critical applications as camera-based driver assistance systems, in which, for example, the formation of a blind area by a particle adhering to a lens of the camera is not uncommon. In this case, the automatically detected impairment of the field of vision of the camera may trigger either an immediate cleaning or a notification to the user, so that the user may immediately take the necessary steps for restoring safety. Thus, the object recognition functionality or the lane recognition functionality of the camera may be maintained or restored in a simple and rapid manner.

A method for ascertaining a blind area of a camera is described, the method including the following steps:

forming a first signal curve of a plurality of gradients, which have been determined as a function of gray values of adjacent image points of an image section of a first image recorded by the camera, and a second signal curve of a plurality of gradients, which have been determined as a function of gray values of the adjacent image points of the image section of a second image recorded by the camera, the second image having been recorded with a time lag relative to the first image; and detecting the blind area, if a comparison of the first signal curve with the second signal curve shows that at least one section of the first signal curve is identical, or is identical within a tolerance range, to a corresponding section of the second signal curve.

The method may be carried out in a camera or in a device coupled to the camera. The camera may be, for example, a digital video camera.

The blind area of the camera may be characterized, in that at this position no faithful recording of the surroundings even minimally distant from the camera is possible. One reason for this may be that a lens of the camera is covered at this position from the outside, for example, by a dirt particle adhering to the lens, or due to an object that has landed at this position on the lens such as, for example, a leaf. Also conceivable as another cause for the blind area is a partial malfunction of an image sensor of the camera at this position.

The first and second signal curve may each be represented as a horizontal irregular wave-like graph, the wave shape of which may be characterized by a different manifestation of the gradient underlying it. When entered into a Cartesian coordinate system, the first and second signal curves may be identical or at least very similar, but phase-shifted due to the time lag between the recording of the first and the second image.

The image points may also be referred to as pixels, whereby a rise or a downward slope of a gradient may be based on a magnitude of a difference between the gray values of the adjacent image points. The gray value of an image point may refer to an apparent brightness of the image point, i.e., a measure of how bright or dark the particular image point appears to the human eye.

An image section may mean a strip-like segment of the first or second image extending from one edge to the opposite edge of the first or second image. The image section in this case may run horizontally or vertically across the image. The image section may also be characterized in that it has matching image coordinates in the first image and in the second image, respectively.

A tolerance range may be understood to mean a range in which a difference between corresponding values of the section of the first signal curve and corresponding values of the section of the second signal curve differs, for example, by no more than 10 percent of the particular values of the section of the first and second signal curves.

The section of the first signal curve and the corresponding section of the second signal curve may have been created based on the same image points. The time lag between the first and the second images may be in the millisecond range or in the nanosecond range.

According to one specific embodiment of the method, the first signal curve and/or the second signal curve may be formed in the step of forming on the basis of gradients, which in each case may be determined using a sum of a predefined number of adjacent image points. With this advantageous windowing of the data processing, the signal curves may be formed in a shorter period of time and with less computing effort.

In addition, in the step of detecting, the blind area may be detected, if the comparison of the first signal curve with the second signal curve shows that the section of the first signal curve and the corresponding section of the second signal curve exhibit no slope within a tolerance range. The tolerance range in this case may refer to a degree of the slope of the first or the second signal curve. For example, the section of the first signal curve as well as the corresponding section of the second signal curve may each exhibit a positive or negative slope in the tolerance range of 0% to 2%. Due to the easy and rapid identifiability of the flat or low gradient sections in the signal curve, this specific embodiment of the method may represent both a robust and resource-conserving method for detecting blind camera areas.

According to another specific embodiment, in the step of forming, a third signal curve of a plurality of gradients, which have been determined as a function of gray values of adjacent image points of a second image section of the first image recorded by the camera, may be formed, and a fourth signal curve of a plurality of gradients, which have been determined as a function of the gray values of the adjacent image points of the second image section of the second image recorded by the camera, may be formed. Correspondingly, in the step of detecting the blind area, it may be detected whether a comparison of the third signal curve with the fourth signal curve shows that at least one section of the third signal curve is identical to a corresponding section of the fourth signal curve. With this specific embodiment, it is readily possible to deduce a size and/or shape of the blind camera area, based on the additional image information provided with the aid of the second image section.

For example, in the step of forming, an image section extending at a predetermined distance in parallel to the first image section may be determined as the second image section. The parallelism in this case is understood to be local and not temporal. Alternatively, in the step of forming, an image section which shares at least one image point with the first image section may be determined as the second image section. For example, the second image section may be selected in such a way that it intersects the first image section at a right angle. With these specific embodiments of the method, there are two useful possibilities for screening the image surface of a camera recording for optimal identification of shape and size of the blind area of the camera. Which of the two specific embodiments are selected in the specific case may depend on an individual specification of the method.

According to another specific embodiment of the method, in the step of forming, a fifth signal curve of a plurality of gradients, which have been determined as a function of gray values of adjacent image points of a third image section of the first image recorded by the camera, may be formed, and a sixth signal curve of a plurality of gradients, which have been determined as a function of gray values of adjacent image points of the third image section of the second image recorded by the camera, may be formed. In this case, an image section extending at a predetermined distance in parallel to the second image section may be determined as the third image section. Thus, an advantageous refinement of the aforementioned screening may be implemented, with the aid of which the sizes and shapes of the blind area may be determined in even greater detail.

For example, the step of forming may be carried out in a hard-wired hardware structure and/or the step of detecting may be carried out in a program-controlled computing structure. This specific embodiment makes it possible to carry out the method using simply configured electronic elements, which may be cost-effectively produced in large quantities.

A device for ascertaining a blind area of a camera is also provided, the device including the following features:

a unit for forming a first signal curve of a plurality of gradients, which have been determined as a function of gray values of adjacent image points of an image section of a first image recorded by the camera, and a second signal curve of a plurality of gradients, which have been determined as a function of gray values of adjacent image points of the image section of a second image recorded by the camera, the second image having been recorded with a time lag relative to the first image; and a unit for detecting the blind area, if a comparison of the first signal curve with the second signal curve shows that at least one section of the first signal curve is identical to a corresponding section of the second signal curve.

The device may, for example, be a video camera or a device coupled to a video camera.

The device may be configured to carry out or implement the steps of a variant of the method described herein in its corresponding devices. With this embodiment variant of the present invention in the form of a device as well, it is possible to quickly and efficiently achieve the object underlying the present invention.

A device in the present case may be understood to mean an electrical device, which processes sensor signals and outputs control signals and/or data signals as a function thereof. The device may include an interface, which may be configured on the hardware side and/or on the software side. When configured as hardware, the interfaces may, for example, be part of a so-called system ASIC, which contains a wide variety of functions of the device. It is also possible, however, that the interfaces are dedicated integrated circuits, or are made up at least partly of discrete components. When configured as software, the interfaces may be software modules which, for example, are present in a microcontroller in addition to other software modules.

A computer program product having program code is also advantageous, which may be stored on a machine-readable medium, such as a semiconductor memory, a hard-disk memory or an optical memory, and is used to carry out and/or control the steps of the method according to one of the above described specific embodiments, in particular, when the program product is executed on a computer or a device.

The approach described herein is explained by way of example in greater detail below with reference to the attached drawings.

DETAILED DESCRIPTION

Figure 1:
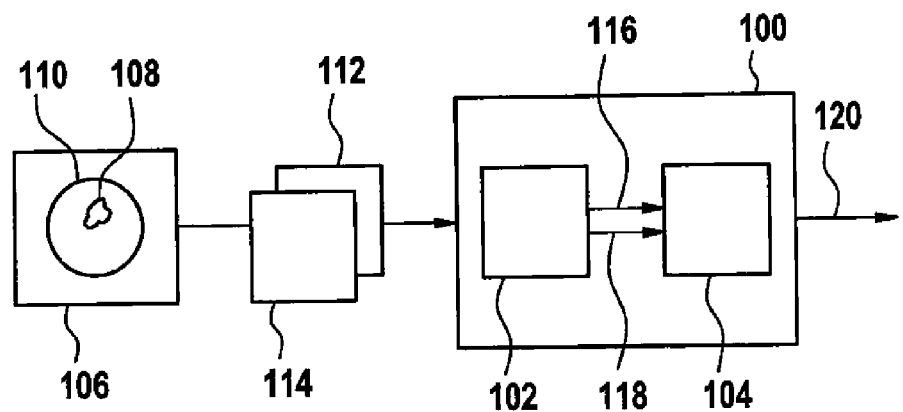
FIG. 1 shows a block diagram of a device for ascertaining a blind area of a camera according to one exemplary embodiment of the present invention.

In the following description of advantageous exemplary embodiments of the present invention, identical or similar reference numerals are used for elements which are similar operating elements and represented in the various figures, a repeated description of these elements being omitted.

FIG. 1 shows a block diagram of a device 100 for ascertaining a blind area of a camera, according to one exemplary embodiment of the present invention. Device 100 includes a unit 102 for forming signal curves and a unit 104 for detecting the blind area, and in this case is coupled via a wiring system to a camera 106. According to alternative exemplary embodiments, device 100 may be integrated into camera 106. According to exemplary embodiments, camera 106 may, for example, be a vehicle video camera of a video-based driver assistance system, a security camera or an industrial camera for monitoring process flows, etc. According to exemplary embodiments, camera 106 may be part of a mono-camera system, a stereo-camera system, a 360°-camera system, or of another camera system.

As the representation in FIG. 1 shows, camera 106 has a blind area 108, which is formed by an object adhering to a lens 110 of camera 106. Blind area 108 adversely affects the functionality of camera 106, since at the position of blind area 108, it is impossible to produce a recording of the camera surroundings situated behind the object. The object causing blind area 108 may, for example, be adherent dirt particles such as, for example, falling leaves, ice, snow, bird excrement or sticky chemical particles, which may be present in industrial surroundings. Instead of an object adhering to the camera, blind area 108 may, as an alternative to the exemplary embodiment shown, also be due to a partial malfunction of an image sensor of camera 106, for example.

In the exemplary embodiment of device 100 shown in FIG. 1, unit 102 includes a hard-wired hardware structure such as, for example, an FPGA (field programmable gate array), i.e., a programmable logic gate array in the field of application, which is able to form the signal curves. FPGAs and similarly constructed electronic components are distinguished by the fact that they are suited, in particular, for efficient, parallel implementation of repeated computing processes. For this reason, it is useful to carry out the formation or calculation of the signal curves in an FPGA, to be understood in terms of a pre-processing, and to provide them to a microcontroller for further processing. Unit 104 in the exemplary embodiment shown includes a program-controlled computing structure, for example, a microcontroller, which is able to compare the signal curves in order to detect the blind area.

As shown in the representation in FIG. 1, camera 106 is configured to transmit image data of a first image 112 and of a second image 114 produced with a time lag relative to first image 112 via a shared interface to device 100. First image 112 and second image 114 may be recordings of a periphery or surroundings of camera 106. The time lag between the recordings may be in the millisecond range or the nanosecond range. Unit 102 is configured, based on the received image data of first image 112, to form a first signal curve 116 of a plurality of gradients, which have been determined as a function of gray values of adjacent image points of an image section of first image 112. Unit 102 is also configured, based on the received image data of second image 114, to form a second signal curve 118 of a plurality of gradients, which have been determined as a function of the gray values of adjacent image points of an image section of second image 114.

Signal curves 116, 118 are conveyed from unit 102 to unit 104 via an interface, where a correlation of first signal curve 116 with second signal curve 118 is carried out in a comparison operation. Blind area 108 is detected, when the comparison operation shows that at least one section of first signal curve 116 is identical to a corresponding section of second signal curve 118. When blind area 108 is detected, device 100 outputs a signal 120 via an interface. According to one exemplary embodiment, signal 120 is supplied to a cleaning device for camera 106, which initiates a cleaning of lens 110 in response to signal 120. According to another exemplary embodiment, signal 120 is supplied to an output device, which is configured to output an audible warning to a user of camera 106.

Figure 2:
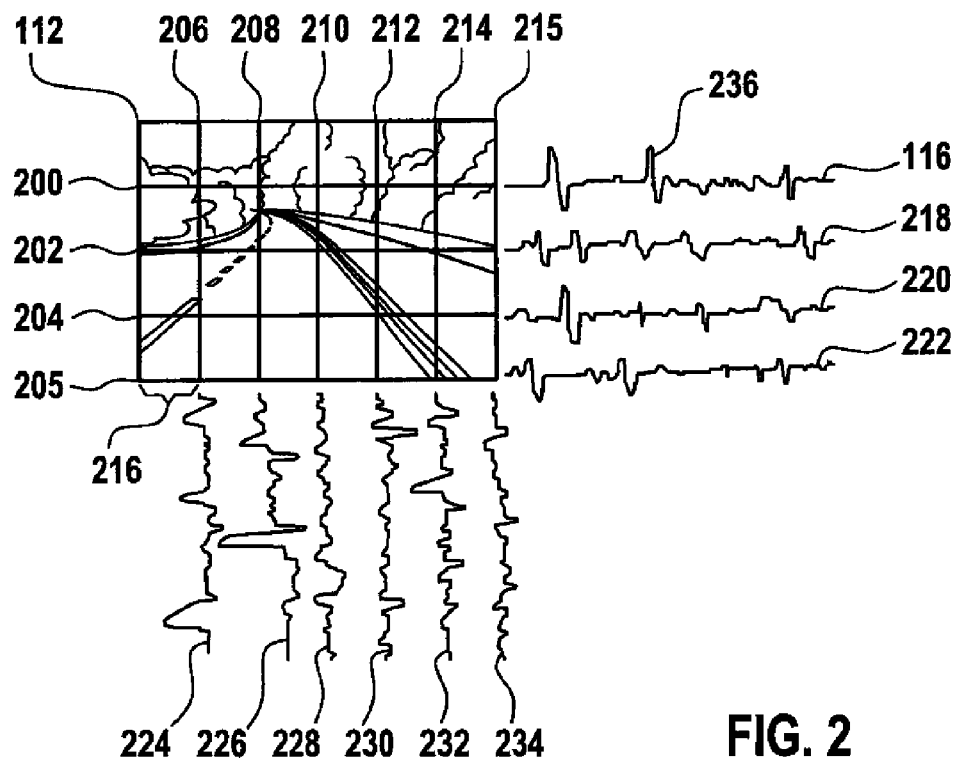
FIG. 2 shows a representation of a camera image with no blind area including signal curves of sum-based gradients line by line and column by column according to one exemplary embodiment of the present invention.

FIG. 2 shows a representation of an exemplary camera image, which has been produced without a blind area of a camera. An exemplary first image 112 of the camera from FIG. 1 is shown. In this case, the camera is used in a vehicle as part of a driver assistance system. Accordingly, first image 112 shows vehicle surroundings, more precisely, a segment of a road section ahead of the vehicle.

As illustrated in FIG. 1, the recording or first image 112 is preprocessed in the unit for forming signal curves using an FPGA or a similar electronic element. To generate signal curves, image sections of first image 112 are viewed, in the exemplary embodiment shown in FIG. 2 an image section 200, a second image section 202, a third image section 204 and a fourth image section 205, each extending horizontally or line by line between opposite edges of image 112, as well as a fifth image section 206, a sixth image section 208, a seventh image section 210, an eighth image section 212, a ninth image section 214 and a tenth image section 215, each extending vertically or column by column between opposite edges of image 112.

As shown in the representation in FIG. 2, image sections 200, 202, 204, 205, 206, 208, 210, 212, 214, 215 are formed as narrow image strips, each of which includes a plurality of adjacent image points or pixels. Image strips or image sections 200, 202, 204, 205, 206, 208, 210, 212, 214, 215 extend invariably in parallel to the respective opposite side edges of first image 212. The column by column image sections 206, 208, 210, 212, 214, 215 extend in parallel to one another and intersect at a right angle the line by line image sections 200, 202, 204, 205 also extending in parallel to one another. Accordingly, the line by line image sections 200, 202, 204, 205 each share at least one image point with the column by column image sections 206, 208, 210, 212, 214, 215 at each intersection point of image sections 200, 202, 204, 205, 206, 208, 210, 212, 214, 215. In the exemplary embodiment shown in FIG. 2, the horizontal image sections 200, 202, 204, 205 are spaced apart from one another by an invariably constant distance 216. Vertical image sections 206, 208, 210, 212, 214, 215 are spaced apart from one another by the same distance 216. Thus, first image 112 is underlaid by a uniform, lattice-like grid, with which gray value differences in first image 112 may be detected with little computing effort.

The unit for forming signal curves is configured to form an associated signal curve for each image section 200, 202, 204, 205, 206, 208, 210, 212, 214, 215, based on gray values or gray value differences of the adjacent image points of each image section 200, 202, 204, 205, 206, 208, 210, 212, 214, 215 of first image 112 and, based on gray values or gray value differences of the adjacent image points of each image section 200, 202, 204, 205, 206, 208, 210, 212, 214, 215 of the second image—not shown in FIG. 2—again to form an associated signal curve for each image section 200, 202, 204, 205, 206, 208, 210, 212, 214, 215. For the sake of clarity, the individual signal curves in the representation in FIG. 2 are depicted directly following the image sections 200, 202, 204, 205, 206, 208, 210, 212, 214, 215 of first image 112.

Accordingly, the first signal curve 116 is formed, based on the gray value differences of the adjacent image points of image section 200 of first image 112. FIG. 2 does not show that the second signal curve from FIG. 1 is formed based on the gray value differences of the adjacent image points of image section 200 of the second image. According to the same principle, third signal curve 218 is formed for second image section 202 of first image 112, fifth signal curve 220 is formed for third image section 204 of first image 112, seventh signal curve 222 is formed for fourth image section 205 of first image 112, ninth signal curve 224 is formed for fifth image section 206 of first image 112, eleventh signal curve 226 is formed for sixth image section 208 of first image 112, thirteenth signal curve 228 is formed for seventh image section 210 of first image 112, fifteenth signal curve 230 is formed for eighth image section 212 of first image 112, seventeenth signal curve 232 is formed for ninth image section 214 of first image 112 and nineteenth signal curve 234 is formed for tenth image section 215 of first image 112.

As shown in the representation in FIG. 2, signal curves 116, 218, 220, 222, 224, 226, 228, 230, 232, 234 are each composed of a plurality of gradients 236 with different characteristics, of which, for the sake of clarity, only one is provided with a reference numeral by way of example. The characteristic of a gradient is determined by the gray value differences of adjacent pixels of respective image strips 200, 202, 204, 205, 206, 208, 210, 212, 214, 215. The greater the gray value differences or brightness differences between adjacent image points, the more pronounced is the gradient 236. As is apparent from FIG. 2, each of signal curves 116, 218, 220, 222, 224, 226, 228, 230, 232, 234 exhibits an individual irregular wave pattern or zig-zag pattern, which is based on the gray value changes within the respective associated image strip 200, 202, 204, 205, 206, 208, 210, 212, 214, 215.

In the exemplary embodiment shown in FIG. 2, signal curves 116, 218, 220, 222, 224, 226, 228, 230, 232, 234 are formed on the basis of gradients 236, which are determined in each case using a sum of a predefined number of adjacent image points. Based on the line by line or column by column alignment of the underlying image sections 200, 202, 204, 205, 206, 208, 210, 212, 214, 215, signal curves 116, 218, 220, 222 are based on gradients 236 of a line by line windowed summation of gray value differences of adjacent image points, and signal curves 224, 226, 228, 230, 232, 234 are based on gradients 236 of a column by column windowed summation of gray value differences of adjacent image points.

Thus, briefly summarized, in an exemplary unit for forming signal curves using an FPGA, the entire image area of first image 112 and of the second image is first divided into horizontal, equidistant strips 200, 202, 204, 205 laid out as lines, and vertical equidistant strips 206, 208, 210, 212, 214, 215 laid out as columns. The size or width of the strips is configured as a variable parameter. Subsequently, the line by line and column by column gray value summation is calculated in each strip area 200, 202, 204, 205, 206, 208, 210, 212, 214, 215, as well as the one-dimensional signal gradient 236 of each summation signal for each strip 200, 202, 204, 205, 206, 208, 210, 212, 214, 215.

Figure 3:
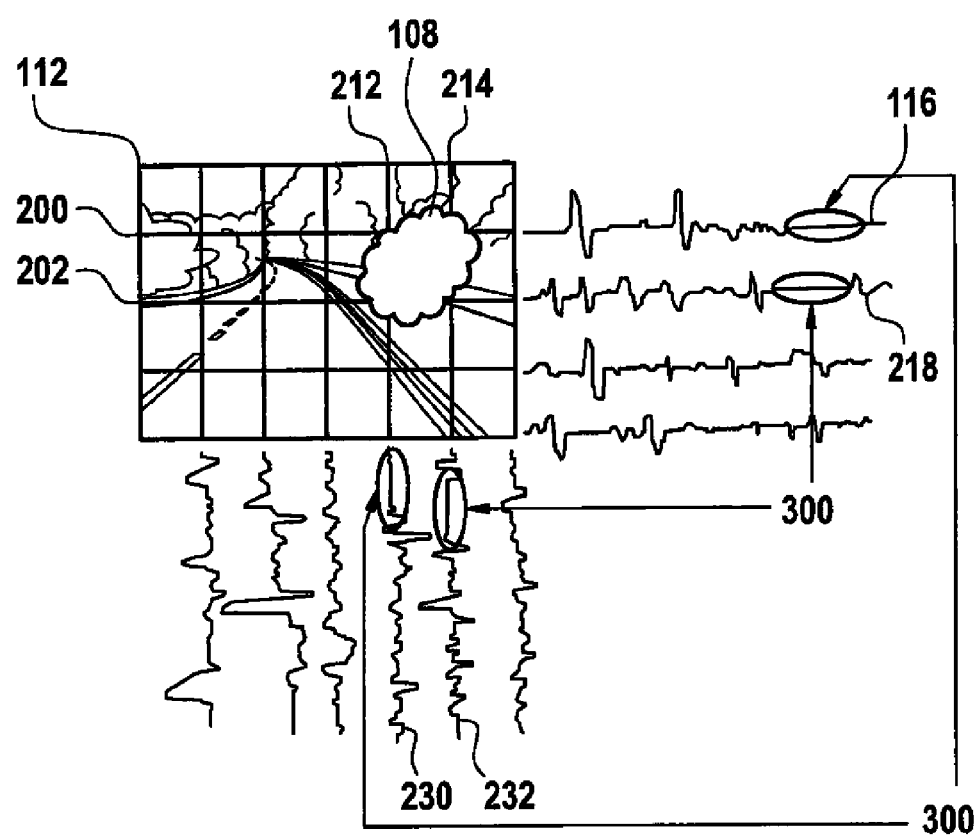
FIG. 3 shows a representation of a camera image with a blind area including signal curves of sum-based gradients line by line and column by column, according to one exemplary embodiment of the present invention.

FIG. 3 shows a representation of another exemplary camera image, which has been produced in the presence of a blind area of a camera. Image 112 of two sequentially produced images of a camera is again shown, with the same grid by image sections as in FIG. 2. The same section of the vehicle surroundings as in FIG. 2 is shown, with the difference that blind area 108 of the camera is present in the right upper quarter of image 112 as a consistently dark spot having an irregular shape with no gray value differences.

Blind area 108 represented by the dark spot in image 112 extends across parts of the horizontal image sections 200 and 202 and across parts of vertical image sections 212 and 214. Accordingly, associated horizontal signal curves 116 and 218, as well as vertical signal curves 230 and 232, each include sections 300 in their areas corresponding to a position of blind area 108 in image strips 200, 202, 212, 214, which exhibit no slope or a barely noticeable slope within a tolerance range. In the exemplary embodiment shown in FIG. 3, the sections 300 are characterized by gradients having a zero slope, and thus differ clearly in their unvariable horizontal character from the wave-like appearance of the remaining sections of each of the signal curves 116, 218, 230, 232.

The device described herein is configured to detect blind area 108, if in the second image (not shown here), produced with a time lag relative to first image 112, the same signal curves exhibit identical horizontal signal curves at the same point. The following FIGS. 4 and 5 treat this in greater detail with reference to an exemplary comparison of two signal curves in each figure. The graphs shown illustrate graphically the two situations, presence and absence of the blind area, and the corresponding detection criteria.

Figure 4:
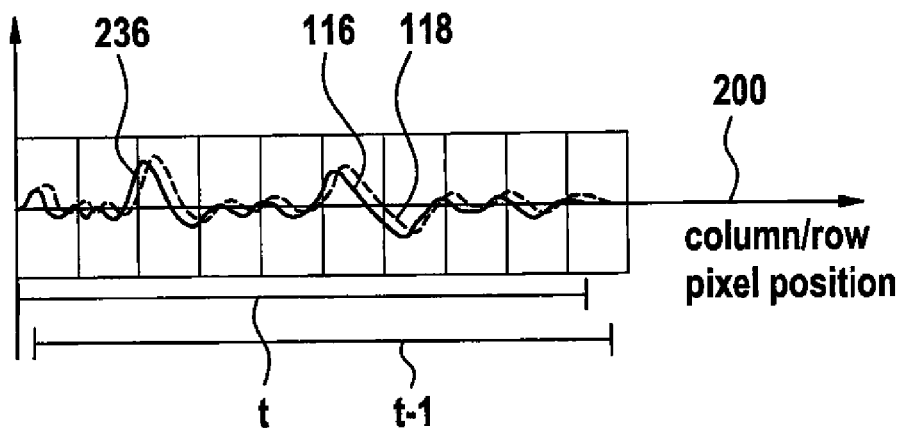
FIG. 4 shows a representation of a comparison of signal curves in the absence of a blind area, according to one exemplary embodiment of the present invention.

FIG. 4 shows a representation of a comparison of signal curves in the absence of a blind area according to one exemplary embodiment of the present invention. A Cartesian coordinate system is shown, in which an exemplary first signal curve 116 of a first image of a camera recorded at a point in time t, and an exemplary second signal curve 118 of a second image of a camera recorded in a later, equally long time window t−1, are plotted. First signal curve 116 is represented by a graph having a solid line, second signal curve 118 is represented by a graph having a dashed line.

The X-axis of the coordinate system is represented by an exemplary horizontal or line by line image section 200. According to one alternative exemplary embodiment, the X-axis may also be represented by an exemplary vertical or column by column image section. A value or an absolute value of each plurality of gradients 236, of which signal curves 116 and 118 are composed, is plotted on the Y-axis of the coordinate system.

As shown in the representation in FIG. 4, first signal curve 116 and second signal curve 118 are each characterized by a continuous irregular wave pattern. There are no sections in either of the signal curves 116, 118 having a slope near or at zero. In addition, the wave patterns of first signal curve 116 and second signal curve 118 are, when viewed absolutely, essentially identical. However, with the phase shift of the graphs in the diagram based on the time lag between the recording of the first and the second image, neither signal curve 116, 118 exhibits any identical, i.e., fully overlapping, sections. From this, it may be deduced that the camera, which recorded the first and the second image, has no blind area.

The concept of this part of the method described herein illustrated by FIG. 4 is based essentially on an image area comparison or a correlation of an image recorded in the first time window t and of a subsequent image recorded in second time window t−1. The algorithm used is configured for a real time calculation for each time window.

The part of the method described herein illustrated by FIG. 4 for ascertaining a blind area of a camera is carried out according to exemplary embodiments in a microcontroller, which executes the appropriate calculations. The microcontroller initially receives the line summation signals and column summation signals 116, 118 from the FPGA for the two successive images at point in time t and point in time t−1. To fulfill the given detection criteria, the microcontroller subsequently carries out a comparison of signal areas of two successive line summation signals and column summation signals 116, 118 with the aid of a cross-correlation method and by checking the signals for changes or shifts. If a change or shift in the image is detected, there is a great probability that the image area is not covered by a dirt particle.

Figure 5:
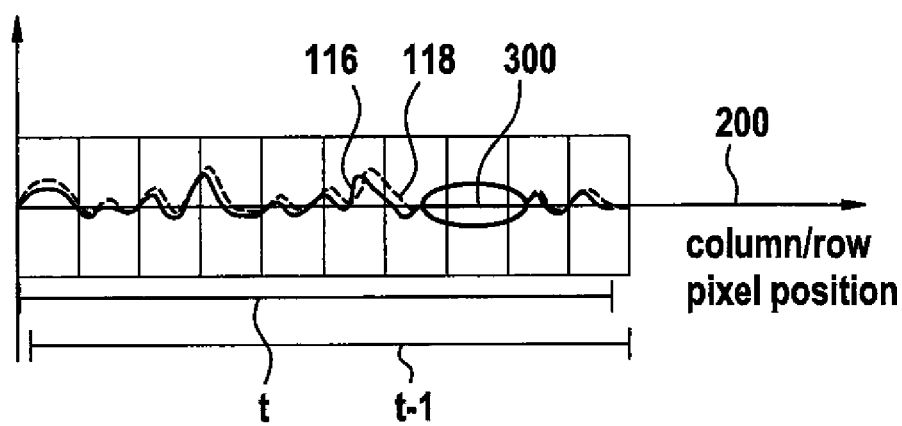
FIG. 5 shows a representation of a comparison of signal curves in the presence of a blind area, according to one exemplary embodiment of the present invention.

FIG. 5 shows a representation of a comparison of signal curves in the presence of a blind area, according to one exemplary embodiment of the present invention. A Cartesian coordinate system having an exemplary horizontal or line by line image section 200 as the X-axis again shows an exemplary first signal curve 116 of a first image of a camera recorded in a time window t, and an exemplary second signal curve 118 of a second image of the camera recorded in a later, equally long time window or in a point in time t−1 following a predefined time interval are plotted. First signal curve 116 is again represented by a graph having a solid line; second signal curve 118 is represented by a graph having a dashed line.

A complete correlation or overlapping of sections 300 of first signal curve 116 and second signal curve 118 is noticeable in the representation in FIG. 5. On the one hand, neither section 300 of signal curves 116, 118 exhibits any slope. On the other hand, the comparison of signal curves 116, 118 in the area of the two sections 300 shows no phase shift as in the remainder of first signal curve 116 and of second signal curve 118. Both sections 300 start and end at the same positions in the diagram shown in FIG. 5. From the coinciding sections 300 of the profile of the two signal curves 116, 118 it is deduced, according to the approach described, that the camera has a blind area, for example, in the form of a dirt particle adhering to a lens of the camera.

Thus, if two successive signal areas of signals 116, 118, such as sections 300, exhibit no shift or change of signal curve, it is detected that the corresponding area of the camera is covered by an adhering dirt particle.

Figure 6:
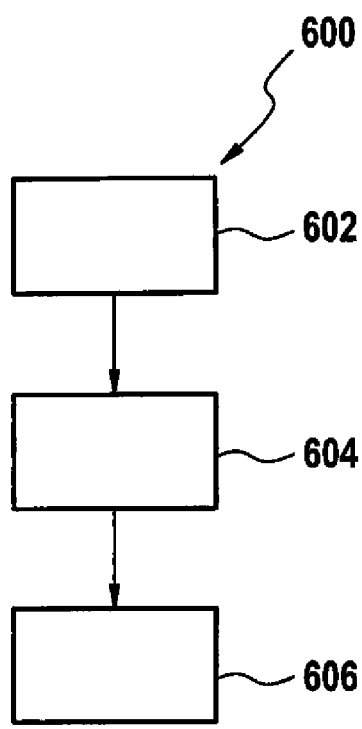
FIG. 6 shows a flow chart of a method for ascertaining a blind area of a camera, according to one exemplary embodiment of the present invention.

FIG. 6 shows a flow chart of one exemplary embodiment of a method 600 for detecting blind areas of a camera, for example, due to soiling by a dirt particle adhering to the camera. The method may be carried out, for example, in the device shown in FIG. 1 for ascertaining a blind area of the camera.

In a step 602, a first signal curve is formed, based on gray value differences of adjacent image points of at least one image section in a first camera image, and a second signal curve is formed, based on gray value differences of adjacent image points of the image section in a second, chronologically subsequent camera image. In a step 604, the blind area is detected, if it is determined in a comparison of the first signal curve with the second signal curve that a section of the first signal curve is identical to a corresponding section of the second signal curve. In a step 606, a signal, based on the detection of the blind area, is output to an automatic cleaning unit for cleaning the camera, or alternatively a warning signal is output to a user of the camera via a suitable interface.

The method described herein is potentially applicable in vehicle camera systems or stationary security cameras or industrial cameras in an environment of moveable objects.

The exemplary embodiments described and shown in the figures are selected merely as examples. Different exemplary embodiments may be fully combined with one another or with respect to individual features. One exemplary embodiment may also be supplemented by features of another exemplary embodiment.

In addition, the method steps described herein may be carried out repeatedly, as well as in a sequence different from that described herein.

If an exemplary embodiment includes an "and/or" link between a first feature and a second feature, this is to be read in the sense that the exemplary embodiment according to one specific embodiment includes both the first feature as well as the second feature, and according to another specific embodiment, either just the first feature or just the second feature.

What is claimed is:

1. A method for detecting a blind area of a camera, the method comprising:
    forming a first signal curve of a plurality of gradients, which have been determined as a function of gray values of adjacent image points of a first image section of a first image recorded by the camera;
    forming a second signal curve of a plurality of gradients, which have been determined as a function of gray values of adjacent image points of a first image section of a second image recorded co-located with the first image section of the first image, the second image having been recorded by the camera with a time lag relative to the first image; and
    detecting the blind area, if a comparison of the first signal curve with the second signal curve shows that at least one section of the first signal curve is identical to a corresponding section of the second signal curve within a tolerance range;
    wherein in the forming, a third signal curve of a plurality of gradients, which have been determined as a function of gray values of adjacent image points of a second image section of the first image, is formed, and a fourth signal curve of a plurality of gradients, which have been determined as a function of gray values of adjacent image points of a second section of the second image co-located with the second image section of the first image, is formed.

2. The method of claim 1, wherein in the forming, the first signal curve and/or the second signal curve is formed based on gradients, which are determined in each case using a sum of a predefined number of adjacent image points.

3. The method of claim 1, wherein in the detecting, the blind area is detected, if the comparison of the first signal curve with the second signal curve also shows that the section of the first signal curve and the corresponding section of the second signal curve exhibit no slope within a tolerance range.

4. The method of claim 1, wherein the blind area is detected in the detecting if, in addition, a comparison of the third signal curve with the fourth signal curve shows that at least one section of the third signal curve is identical to a corresponding section of the fourth signal curve.

5. The method of claim 4, wherein in the forming, an image section extending parallel to the first image section at a predefined distance to the first image section is determined as the second image section.

6. The method of claim 4, wherein in the forming, an image section, which shares at least one image point with the first image section, is determined as the second image section.

7. The method of claim 4, wherein in the forming, in addition, a fifth signal curve of a plurality of gradients, which have been determined as a function of gray values of adjacent image points of a third image section of the first image, is formed, and a sixth signal curve of a plurality of gradients, which have been determined as a function of gray values of adjacent image points of a third image section of the second image co-located with the third image section of the first image, is formed, wherein an image section extending at a predetermined distance in parallel to the second image section is determined as the third image section.

8. The method of claim 1, wherein the forming is performed in a hard-wired hardware structure and/or the detecting is performed in a program-controlled computing structure.

9. A device for detecting a blind area of a camera, comprising:
a forming arrangement to form a first signal curve of a plurality of gradients, which have been determined as a function of gray values of adjacent image points of a first image section of a first image recorded by the camera, and to form a second signal curve of a plurality of gradients, which have been determined as a function of gray values of adjacent image points of a first section of a second image co-located with the first image section of the first image, the second image having been recorded by the camera with a time lag relative to the first image; and
a detecting arrangement to detect the blind area, if a comparison of the first signal curve with the second signal curve shows that at least one section of the first signal curve is identical to a corresponding section of the second signal curve within a tolerance range;
wherein in the forming, a third signal curve of a plurality of gradients, which have been determined as a function of gray values of adjacent image points of a second image section of the first image, is formed, and a fourth signal curve of a plurality of gradients, which have been determined as a function of gray values of adjacent image points of a second section of the second image co-located with the second image section of the first image, is formed.

10. The device of claim 9, wherein the blind area is detected in the detecting if, in addition, a comparison of the third signal curve with the fourth signal curve shows that at least one section of the third signal curve is identical to a corresponding section of the fourth signal curve.

11. The device of claim 10, wherein in the forming, an image section extending parallel to the first image section at a predefined distance to the first image section is determined as the second image section.

12. The device of claim 10, wherein in the forming, an image section, which shares at least one image point with the first image section, is determined as the second image section.

13. The device of claim 10, wherein in the forming, in addition, a fifth signal curve of a plurality of gradients, which have been determined as a function of gray values of adjacent image points of a third image section of the first image, is formed, and a sixth signal curve of a plurality of gradients, which have been determined as a function of gray values of adjacent image points of a third image section of the second image co-located with the third image section of the first image, is formed, wherein an image section extending at a predetermined distance in parallel to the second image section is determined as the third image section.

14. The device of claim 9, wherein in the forming, the first signal curve and/or the second signal curve is formed based on gradients, which are determined in each case using a sum of a predefined number of adjacent image points.

15. The device of claim 9, wherein in the detecting, the blind area is detected, if the comparison of the first signal curve with the second signal curve also shows that the section of the first signal curve and the corresponding section of the second signal curve exhibit no slope within a tolerance range.

16. A computer-readable memory medium having a computer program, which is executable by a processor, comprising:
a program code arrangement having program code for detecting a blind area of a camera, by performing the following:
forming a first signal curve of a plurality of gradients, which have been determined as a function of gray values of adjacent image points of a first image section of a first image recorded by the camera;
forming a second signal curve of a plurality of gradients, which have been determined as a function of gray values of adjacent image points of a first section of a second image co-located with the first image section of the first image, the second image having been recorded by the camera with a time lag relative to the first image; and
detecting the blind area, if a comparison of the first signal curve with the second signal curve shows that at least one section of the first signal curve is identical to a corresponding section of the second signal curve within a tolerance range;
wherein in the forming, a third signal curve of a plurality of gradients, which have been determined as a function of gray values of adjacent image points of a second image section of the first image, is formed, and a fourth signal curve of a plurality of gradients, which have been determined as a function of gray values of adjacent image points of a second section of the second image co-located with the second image section of the first image, is formed.

17. The computer-readable memory medium of claim 16, wherein in the forming, the first signal curve and/or the second signal curve is formed based on gradients, which are determined in each case using a sum of a predefined number of adjacent image points.

18. The computer-readable memory medium of claim 16, wherein the blind area is detected in the detecting if, in addition, a comparison of the third signal curve with the fourth signal curve shows that at least one section of the third signal curve is identical to a corresponding section of the fourth signal curve.

19. The computer-readable memory medium of claim 18, wherein in the forming, an image section extending parallel to the first image section at a predefined distance to the first image section is determined as the second image section.

20. The computer-readable memory medium of claim 18, wherein in the forming, an image section, which shares at least one image point with the first image section, is determined as the second image section.

21. The computer-readable memory medium of claim 18, wherein in the forming, in addition, a fifth signal curve of a plurality of gradients, which have been determined as a function of gray values of adjacent image points of a third image section of the first image, is formed, and a sixth signal curve of a plurality of gradients, which have been determined as a function of gray values of adjacent image points of a third image section of the second image co-located with the third image section of the first image, is formed, wherein an image section extending at a predetermined distance in parallel to the second image section is determined as the third image section.

* * * * *